United States Patent
Yamada et al.

(10) Patent No.: US 8,216,719 B2
(45) Date of Patent: Jul. 10, 2012

(54) NON-AQUEOUS SECONDARY BATTERY AND METHOD FOR PRODUCING THE SAME

(75) Inventors: Masayuki Yamada, Osaka (JP); Kazutaka Uchitomi, Osaka (JP); Qiao Shi, Osaka (JP); Hiroshi Fukunaga, Osaka (JP); Kazunobu Matsumoto, Osaka (JP)

(73) Assignee: Hitachi Maxell Energy, Ltd., Otokuni-Gun, Kyoto (JP)

( * ) Notice: Subject to any disclaimer, the term of this patent is extended or adjusted under 35 U.S.C. 154(b) by 1013 days.

(21) Appl. No.: 11/704,954

(22) Filed: Feb. 12, 2007

(65) Prior Publication Data

US 2007/0190416 A1    Aug. 16, 2007

(30) Foreign Application Priority Data

Feb. 13, 2006   (JP) .................................. 2006-034918

(51) Int. Cl.
*H01M 4/13*   (2010.01)
*H01M 4/60*   (2006.01)
*H01M 4/58*   (2010.01)

(52) U.S. Cl. ..................... 429/215; 429/213; 429/231.8; 429/231.95

(58) Field of Classification Search .................. 429/213, 429/215, 231.95, 231.8
See application file for complete search history.

(56) References Cited

U.S. PATENT DOCUMENTS

| | | | | |
|---|---|---|---|---|
| 5,869,208 | A | * | 2/1999 | Miyasaka ..................... 429/224 |
| 6,383,686 | B1 | * | 5/2002 | Umeno et al. ............. 429/231.8 |
| 2003/0215711 | A1 | | 11/2003 | Aramata et al. |
| 2005/0233213 | A1 | | 10/2005 | Lee et al. |

FOREIGN PATENT DOCUMENTS

| JP | 9-283179 A | 10/1997 |
|---|---|---|
| JP | 2000-182602 A | 6/2000 |
| JP | 2004-47404 A | 2/2004 |
| JP | 2005-259697 A | 9/2005 |

* cited by examiner

*Primary Examiner* — Patrick Ryan
*Assistant Examiner* — Julian Anthony
(74) *Attorney, Agent, or Firm* — Birch, Stewart, Kolasch & Birch, LLP (57) ABSTRACT

A non-aqueous secondary battery of the present invention includes a positive electrode, a negative electrode and a non-aqueous electrolyte. The positive electrode includes a positive electrode material mixture layer containing a lithium-containing transition metal oxide. The negative electrode includes a negative electrode material mixture layer and a porous layer containing an insulating material unreactive with lithium formed thereon. The negative electrode material mixture layer includes a negative electrode material including a core and a carbon covering layer covering a surface of the core. The core includes a material containing silicon and oxygen at an atomic ratio x of the oxygen to the silicon of $0.5 \leq x \leq 1.5$. The material containing silicon and oxygen has a peak at least in a range of 1850 to 1860 eV in an X-ray absorption near edge structure spectrum at the K absorption edge of Si in a state in which discharge of the battery is finished.

20 Claims, 2 Drawing Sheets

NON-AQUEOUS SECONDARY BATTERY AND METHOD FOR PRODUCING THE SAME

BACKGROUND OF THE INVENTION

1. Field of the Invention

The present invention relates to a non-aqueous secondary battery and a method for producing the same.

2. Description of Related Art

Much attention has been paid to the development of non-aqueous secondary batteries because they have a high voltage and a high capacity. Non-aqueous secondary batteries employ, as a negative electrode material (negative electrode active material), lithium (Li), a Li alloy, or a natural or artificial graphite carbon material capable of intercalating and deintercalating Li ions.

Recently, however, compact portable devices having multiple functions require higher capacity batteries. To meet such demand, materials capable of absorbing a larger amount of Li (hereinafter sometimes referred to as "high capacity negative electrode material"), such as low crystalline carbon, silicon (Si) and tin (Sn), are attracting a lot of attention as promising negative electrode materials.

One of the promising high capacity negative electrode materials for non-aqueous secondary batteries is a composite material ($SiO_x$) having a structure in which Si ultrafine particles are dispersed in $SiO_2$. In a battery containing this composite material, charge/discharge reaction proceeds smoothly because Si that reacts with Li is in the form of ultrafine particles. At the same time, because $SiO_x$ particles having the above structure have a small surface area, the composite material offers good spreadability when used as a coating material for forming a negative electrode material mixture layer. The composite material also offers good adhesion between a negative electrode material mixture layer and a current collector.

$SiO_x$, however, is a low conductive material, and therefore when a negative electrode is formed using this material, $SiO_x$ should be thoroughly mixed/dispersed with a conductive auxiliary material. JP 2004-47404 A and JP 2005-259697A disclose a technique to cover the surface of $SiO_x$ with carbon to increase its conductivity before the formation of a negative electrode.

Because $SiO_x$ has a relatively large irreversible capacity, in order to achieve a higher capacity battery containing $SiO_x$ as a negative electrode material, it is preferable to introduce a Li source such as Li metal into the negative electrode material.

A method for introducing Li metal into a negative electrode material is to attach a Li metal foil onto the surface of a negative electrode material mixture layer containing the negative electrode material so as to introduce the Li metal contained in the Li metal foil into the negative electrode material contained in the negative electrode material mixture layer. However, the present inventors found the following through studies. When a Li metal foil is placed directly onto a negative electrode material mixture layer containing $SiO_x$, because $SiO_x$ is highly reactive with Li, the Li contained in the Li metal foil enters the $SiO_x$ only upon contact of the Li metal foil with the negative electrode material mixture layer, causing an expansion of $SiO_x$. Further, the introduction reaction of Li occurs locally and nonuniformly, so that the produced negative electrode is curved.

As a technique to introduce Li metal into a negative electrode material before the formation of a battery, JP 2000-182602A proposes to produce a battery using a negative electrode in which a support layer containing water-insoluble particles is formed between a layer containing a negative electrode material (negative electrode material mixture layer) and a Li metal foil. If the rate of introducing Li from the Li metal foil into the negative electrode material mixture layer is controlled by applying the technique disclosed in JP 2000-182602A and investigating the constitution of the support layer, even when $SiO_x$ is used as a negative electrode material, the negative electrode may not be curved.

However, the present inventors examined and found that even when a non-aqueous secondary battery is formed by applying the technique disclosed in JP 2000-182602A, when the positive electrode material comprises a Li-containing transition metal oxide, lithium dendrites are deposited on the negative electrode containing $SiO_x$. As a result, the battery characteristics tend to be poor. This is presumably because the Li metal foil has a certain thickness (several tens of micrometers), a larger amount of Li in a metallic state is present in the battery than the amount required to be introduced into the $SiO_x$, and the excess Li is deposited onto the negative electrode, forming dendrites. Because the Li metal foil is very soft, it is difficult to form it into a uniformly thin film or to previously control the amount of Li introduced into the negative electrode material.

According to the constitution disclosed in JP 2000-182602A, the negative electrode material comprises an Sn oxide having a large irreversible capacity, which requires a larger amount of Li than $SiO_x$, and the positive electrode material (positive electrode active material) comprises a metal oxide originally containing no Li, which is capable of absorbing Li. It thus appears that the deposition of dendrites can be prevented even when a Li metal foil is used. However, in order to achieve a higher capacity non-aqueous secondary battery, it is preferable that a Li-containing transition metal oxide is used as a positive electrode material (positive electrode active material) rather than a metal oxide containing no Li, and therefore it is desired to achieve a much higher capacity battery by combining a positive electrode containing a Li-containing transition metal oxide with a negative electrode containing $SiO_x$ as a negative electrode material.

SUMMARY OF THE INVENTION

Therefore, with the foregoing in mind, it is an object of the present invention to provide a high capacity non-aqueous secondary battery having excellent battery characteristics and to provide a method for producing the non-aqueous secondary battery.

A first non-aqueous secondary battery of the present invention comprises a positive electrode, a negative electrode and a non-aqueous electrolyte, the positive electrode comprising a positive electrode material mixture layer containing a lithium-containing transition metal oxide, the negative electrode comprising a negative electrode material mixture layer and a porous layer formed on the negative electrode material mixture layer, the negative electrode material mixture layer including a negative electrode material comprising a core and a carbon covering layer covering a surface of the core, the core including a material comprising silicon and oxygen at an atomic ratio x of the oxygen to the silicon of $0.5 \leq x \leq 1.5$, the porous layer containing an insulating material unreactive with lithium, wherein the material comprising silicon and oxygen has a peak at least in a range of 1850 to 1860 eV in an X-ray absorption near edge structure spectrum at the K absorption edge of Si in a state in which discharge of the battery is finished.

A second non-aqueous secondary battery of the present invention comprises a positive electrode, a negative electrode and a non-aqueous electrolyte, the positive electrode comprising a positive electrode material mixture layer containing a lithium-containing transition metal oxide, the negative electrode comprising a negative electrode material mixture layer and a porous layer formed on the negative electrode material mixture layer, the negative electrode material mixture layer including a negative electrode material comprising a core and a carbon covering layer covering a surface of the core, the core including a material comprising silicon and oxygen at an atomic ratio x of the oxygen to the silicon of $0.5 \leq x \leq 1.5$, the porous layer containing an insulating material unreactive with lithium, wherein the material comprising silicon and oxygen contains lithium at an atomic ratio y of the lithium to the silicon of $0.8 \leq y \leq 2.4$ in a state in which discharge of the battery is finished.

A method for producing a non-aqueous secondary battery of the present invention is a method for producing a non-aqueous secondary battery comprising a positive electrode including a positive electrode material mixture layer containing a lithium-containing transition metal oxide, a negative electrode and a non-aqueous electrolyte, the method comprising the steps of forming a negative electrode material mixture layer including a negative electrode material comprising a core and a carbon covering layer covering a surface of the core, the core including a material comprising silicon and oxygen at an atomic ratio x of the oxygen to the silicon of $0.5 \leq x \leq 1.5$, forming, on the negative electrode material mixture layer, a buffer layer for suppressing a reaction between lithium and the negative electrode material, forming a lithium-containing layer on the buffer layer by a vapor deposition method, and allowing the lithium contained in the lithium-containing layer to be absorbed into the negative electrode material by an electrochemical reaction.

According to the present invention, because the buffer layer (e.g., a porous layer containing an insulating material unreactive with Li) capable of suppressing a reaction in which lithium is absorbed into the negative electrode material is formed on the negative electrode material mixture layer, when Li is absorbed into the negative electrode material contained in the negative electrode material mixture layer (the negative electrode material including a core and a carbon covering layer covering a surface of the core, the core including a material containing silicon (Si) and oxygen (O) at an atomic ratio x of O to Si of $0.5 \leq x \leq 1.5$), it is possible to prevent a rapid and nonuniform reaction between lithium and the material containing Si and O, and to prevent the negative electrode from curving caused by the expansion of the negative electrode material mixture layer. In addition, according to the present invention, a necessary amount of Li can be absorbed into the negative electrode material by an electrochemical reaction, it is thus possible to prevent the formation of dendrites due to the presence of excess lithium, and to prevent the degradation of battery characteristics resulting from the dendrites. Therefore, according to the present invention, because a Li-containing transition metal oxide can be used as a positive electrode material, it is possible to provide a high capacity non-aqueous secondary battery having excellent battery characteristics.

DESCRIPTION OF THE PREFERRED EMBODIMENTS

A non-aqueous secondary battery of the present invention comprises a positive electrode, a negative electrode and a non-aqueous electrolyte. The positive electrode comprises a positive electrode material mixture layer containing a Li-containing transition metal oxide. The negative electrode comprises a negative electrode material mixture layer containing a negative electrode material and a porous layer formed on the negative electrode material mixture layer. The porous layer contains an insulating material unreactive with Li. The negative electrode material comprises: a core comprising a material comprising Si and O at an atomic ratio x of O to Si of $0.5 \leq x \leq 1.5$ (hereinafter sometimes simply referred to as "Si-O containing material"); and a covering layer made of carbon that covers the surface of the core.

The negative electrode of the non-aqueous secondary battery of the present invention can be produced by the following method, for example. First, core particles are formed using a material represented by the general formula $SiO_x$, where $0.5 \leq x \leq 1.5$ (hereinafter sometimes simply referred to as $SiO_x$), which is an example of the Si—O containing material. The core particles may be formed using a material obtained by complexing a plurality of $SiO_x$ particles. Subsequently, the surface of the core particles is covered with carbon to form a negative electrode material having a carbon covering layer formed thereon. A negative electrode material mixture layer containing the negative electrode material is then formed on a current collector. A buffer layer for controlling the reaction between $SiO_x$ and Li is formed on the negative electrode material mixture layer. A Li-containing layer containing Li that is absorbed into the negative electrode material is formed on the buffer layer by a chemical vapor deposition method. Thereby, a negative electrode precursor is formed. Subsequently, the Li contained in the Li-containing layer of the negative electrode precursor is migrated into the negative electrode material mixture layer by an electrochemical reaction, whereby the Li is absorbed into the $SiO_x$ contained in the negative electrode material. In this manner, a negative electrode is produced.

Figure 1:
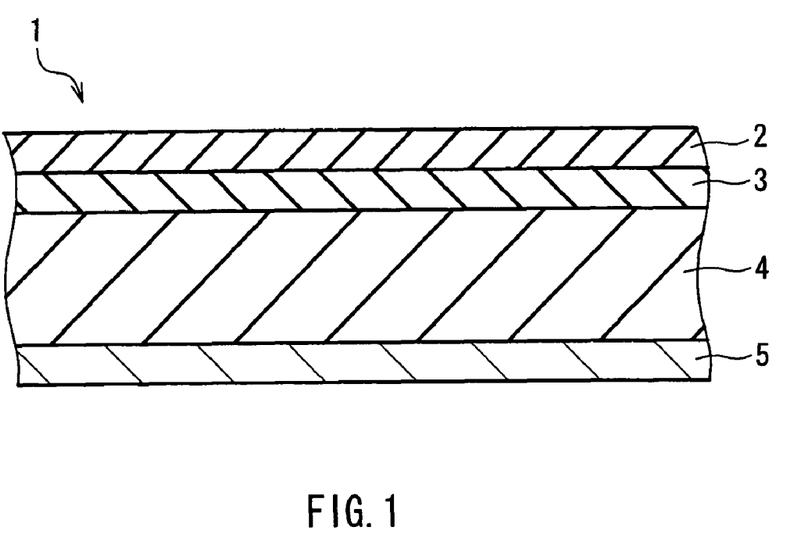
FIG. 1 is a schematic cross-sectional view of an example of a negative electrode precursor used to produce a negative electrode for a non-aqueous secondary battery of the present invention.
Figure 2:
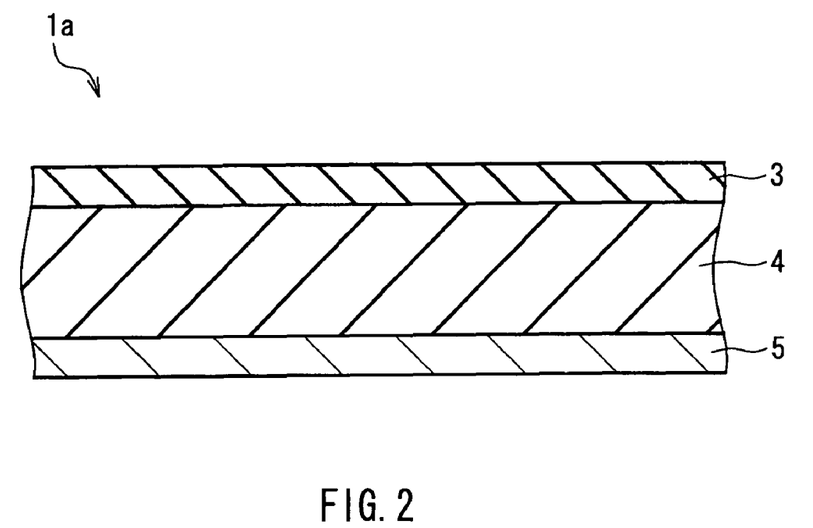
FIG. 2 is a schematic cross-sectional view of an example of a negative electrode for a non-aqueous secondary battery of the present invention.

FIG. 1 is a schematic cross-sectional view of an example of a negative electrode precursor used to produce a negative electrode for a non-aqueous secondary battery of the present invention. FIG. 2 is a schematic cross-sectional view of an example of a negative electrode for a non-aqueous secondary battery of the present invention. In FIG. 1, a negative electrode precursor 1 comprises a negative electrode material mixture layer 4, a buffer layer 3, and a Li-containing layer 2 that are placed in this order. The negative electrode material mixture layer 4 includes a negative electrode material comprising a core comprising a material represented by the general formula $SiO_x$, where $0.5 \leq x \leq 1.5$ and a covering layer of carbon covering the surface of the core. The buffer layer 3 serves to control the reaction between $SiO_x$ and Li. The Li-containing layer 2 is formed by a vapor deposition method. The reference number 5 indicates a current collector. The Li contained in the Li-containing layer 2 of the negative electrode precursor 1 shown in FIG. 1 is introduced into the $SiO_x$ contained in the negative electrode material mixture layer 4 through the buffer layer 3 by an electrochemical reaction that occurs along with the injection of an electrolyte. Thereby, the negative electrode precursor 1 turns into a negative electrode 1a having a constitution as shown in FIG. 2, in which the same reference numbers are given to identical components.

The Si—O containing material contained in the core of the negative electrode material may comprise a microcrystalline or amorphous phase of Si. In this case, the atomic ratio of Si and O can be determined including the microcrystalline or amorphous phase of Si. The Si—O containing material may further contain, as a constituent element(s), an element(s) other than Si and O.

In other words, the Si—O containing material encompasses a simple oxide comprising only Si as well as a composite material having a structure in which Si (e.g., microcrystalline Si) is dispersed in an amorphous $SiO_2$ matrix. In this case, the atomic ratio x, including the amorphous $SiO_2$ and the Si dispersed in the amorphous $SiO_2$, preferably satisfies $0.5 \leq x \leq 1.5$. For example, in the case of a composite material having a structure in which Si is dispersed in an amorphous $SiO_2$ matrix at a molar ratio of $SiO_2$ and Si of 1:1, x equals 1 (x=1). For this reason, this composite material can be represented by the compositional formula SiO. When a composite material having such structure as above is analyzed by, for example, X-ray diffractometry, the peak attributable to Si (microcrystalline Si) may not be observed, but the presence of fine Si can be detected by a transmission electron microscopy.

The core of the negative electrode material is formed of the Si—O containing material. The surface of the core is covered with carbon. As stated previously, $SiO_x$, which is an example of the Si—O containing material, has poor conductivity. Accordingly, when a Si—O containing material is used as a negative electrode active material, it is necessary to add a conductive auxiliary material and to mix and disperse the conductive auxiliary material sufficiently with $SiO_x$ in the negative electrode so as to form an excellent conductive network to ensure excellent battery characteristics. In the negative electrode material of the present invention, however, because the surface of the core that is formed of a Si—O containing material is covered with a carbon covering layer, a more excellent conductive network can be formed in the negative electrode as compared to, for example, a material obtained by simply mixing $SiO_x$ and a conductive auxiliary material such as a carbon material.

The negative electrode material can be complexed with a carbon material serving as a conductive auxiliary material to form a composite. This allows the formation of a further excellent conductive network in the negative electrode. Consequently, a high capacity non-aqueous secondary battery having excellent battery characteristics (e.g., charge/discharge cycle characteristics) can be achieved. An example of the composite is a granulated material obtained by granulating $SiO_x$ particles covered with carbon and a carbon material.

The core for forming the negative electrode material preferably is formed with a composite of the Si—O containing material and a conductive material having a lower specific resistance value than the Si—O containing material. An example of the composite is a granulated material formed of $SiO_x$ and a conductive auxiliary material having a lower specific resistance value than the $SiO_x$. Using such negative electrode material comprising the core formed of the composite and carbon covering the core, an excellent conductive network can be formed even inside the material. Consequently, battery characteristics such as high load discharge characteristics can be further improved.

As the conductive material usable for forming the above composite, for example, a carbon material such as graphite, low crystalline carbon, carbon nanotube and vapor grown carbon fibers, or a metal material can be used.

Preferably, the conductive material is at least one selected from the group consisting of fibrous or coil-shaped carbon material, fibrous or coil-shaped metal material, carbon black (including acetylene black and ketjen black), artificial graphite, graphitizable carbon material and non-graphitizable carbon material. The fibrous or coil-shaped carbon material or fibrous and coil-shaped metal material are preferable because they have a large surface area, and the use thereof allows easy formation of a conductive network. The carbon black, artificial graphite, graphitizable carbon material and non-graphitizable carbon material are preferable because they have high electroconductivity and a high electrolyte-retaining capability. Further, they tend to stay in contact with $SiO_x$ particles even when the $SiO_x$ particles expand and contract during charge/discharge of the battery.

Among the conductive materials listed above, a fibrous carbon material is particularly preferable. Because a fibrous carbon material is in the form of fine threads and is highly flexible, it can follow the expansion and contraction of $SiO_x$ during charge/discharge of the battery. Moreover, because a fibrous carbon material has a high bulk density, it has many contact points with $SiO_x$ particles. Examples of the fibrous carbon material include polyacrylonitrile (PAN) carbon fiber, pitch carbon fiber, vapor grown carbon fiber and carbon nanotube. Any of them can be used.

The fibrous carbon material or fibrous metal material can be formed on the surface of $SiO_x$ particles by, for example, a vapor deposition method.

When the Si—O containing material is $SiO_x$, the specific resistance value of $SiO_x$ normally is $10^3$ to $10^7$ kΩcm, whereas the conductive materials listed above normally have a lower specific resistance value of $10^{-5}$ to 10 kΩcm.

The carbon materials included in the above-listed conductive materials also can be used as a carbon material for forming the composite in which the negative electrode material and the carbon material are complexed.

The negative electrode material may further have a material layer (e.g., a material layer comprising non-graphitizable carbon) for covering the carbon covering layer formed on the surface of the particles.

Hereinafter, more detailed description is given of the case where the Si—O containing material of the present invention is $SiO_x$.

The negative electrode material according to the present invention is produced by the following method, for example.

First, in the case of producing composite core particles by complexing $SiO_x$, a dispersion prepared by dispersing $SiO_x$ in a dispersing medium is sprayed and dried to produce composite core particles comprising a plurality of $SiO_x$ particles. The dispersing medium can be, for example, ethanol. The dispersion normally is sprayed in an atmosphere of 50 to 300° C. Besides the above method, similar composite core particles can be produced by a granulation method using a mechanical method such as a vibration or planetary ball mill or a rod mill.

In the case of producing, as the composite core particles, a granulated material formed of $SiO_x$ and a conductive material having a lower specific resistance value than the $SiO_x$, a dispersion in which $SiO_x$ is dispersed in a dispersing medium is prepared. The above conductive material is added to the dispersion. The resulting dispersing is then sprayed and dried to produce composite core particles comprising the granulated material. Alternatively, similar to the case of producing composite core particles comprising a plurality of $SiO_x$ particles, a granulated material formed of $SiO_x$ and a conductive material can be produced by a granulation method using a mechanical method.

Subsequently, the composite core particles produced in the manner described above ($SiO_x$ composite core particles or a granulated material of $SiO_x$ and a conductive material) are heated with a hydrocarbon gas in a gas phase. The carbon produced by thermal decomposition of the hydrocarbon gas is deposited onto the surface of the composite core particles. By using a chemical vapor deposition method (CVD method) as just described, it is possible to form a uniformly thin film (carbon covering layer) in which the hydrocarbon gas spreads throughout the composite particles and carbon having conductivity is contained in the surface of the particles as well as the pores on the surface of the particles. Accordingly, with the use of a small amount of carbon, conductivity can be imparted uniformly to the core particles comprising $SiO_x$.

The treatment temperature of the CVD method (ambient temperature) varies according to the type of hydrocarbon gas used. Normally, the treatment temperature is 600 to 1200° C. Particularly, a treatment temperature of 700° C. or higher is preferable, and more preferably 800° C. or higher. This is because as the treatment temperature increases, less impurities remain, and a highly conductive carbon covering layer can be formed.

For the liquid source for the hydrocarbon gas, toluene, benzene, xylene, mesitylene or the like can be used. For ease of handling, toluene is particularly preferable. The hydrocarbon gas can be obtained by evaporating the liquid source by, for example, bubbling with a nitrogen gas. A methane gas or acetylene gas also can be used.

After the surface of the composite core particles is covered with carbon by CVD method, another material layer may be further formed on the carbon covering layer of the composite core particles by attaching an organic compound onto the composite core particles having the carbon covering layer formed thereon and by baking the composite core particles having the organic compound attached thereto. The organic compound is at least one selected from the group consisting of petroleum pitch, coal pitch, thermosetting resin and a condensate of a naphthalenesulfonic acid salt and an aldehyde.

More specifically, a dispersion prepared by dispersing the composite core particles covered with carbon and the organic compound in a dispersing medium is sprayed and dried to form composite core particles covered with the organic compound. The obtained composite core particles covered with the organic compound are then baked.

In the listed organic compounds, as the pitch, an isotropic pitch can be used. As the thermosetting resin, phenol resin, furan resin or furfural resin can be used. As the condensate of a naphthalenesulfonic acid salt and an aldehyde, naphthalene sulfate formaldehyde condensate can be used.

As the dispersing medium for dispersing the composite core particles covered with carbon and the organic compound, for example, water or an alcohol (e.g., ethanol) can be used. The dispersion normally is sprayed in an atmosphere of 50 to 300° C. The baking temperature normally is 600 to 1200° C., and preferably 700° C. or higher and more preferably 800° C. or higher. This is because as the treatment temperature increases, less impurities remain, and a covering layer containing a highly conductive carbon material of excellent quality can be formed. Note that the treatment temperature is required to be not higher than the melting point of $SiO_x$.

The negative electrode material mixture layer having a predetermined thickness and a predetermined density can be formed by applying a composition (coating material) in the form of a paste or slurry prepared by thoroughly mixing a mixture (negative electrode material mixture) containing the negative electrode material and a binder with an appropriate solvent (dispersing medium) onto a current collector, followed by drying or the like to remove the solvent. The negative electrode material mixture layer may be formed by a method other than the above method.

Examples of the binder include: polysaccharides, such as starch, polyvinyl alcohol, carboxymethyl cellulose, hydroxypropyl cellulose, regenerated cellulose and diacetyl cellulose, and modified forms of these polysaccharides; thermoplastic resins, such as polyvinyl chloride, polyvinyl pyrrolidone, polytetrafluoroethylene, polyvinylidene fluoride, polyethylene and polypropylene, and modified forms of these thermoplastic resins; elastic polymers, such as ethylene-propylene-dieneter polymer (EPDM), sulfonated EPDM, styrene butadiene rubber, butadiene rubber, polybutadiene, fluorocarbon rubber and polyethylene oxide, and modified forms of these elastic polymers. They can be used singly or in any combination of two or more.

The negative electrode material mixture may further contain a conductive auxiliary material. As the conductive auxiliary material, any electron conductive material can be used as long as it does not cause a chemical change in the non-aqueous secondary battery. Examples of the conductive auxiliary material include natural graphite (vein graphite, flake graphite, amorphous graphite, etc.), artificial graphite, carbon black, acetylene black, ketjen black, carbon fiber, metal powder (copper powder, nickel powder, aluminum powder and silver powder), metal fiber and polyphenylene derivative. They can be used singly or in any combination of two or more.

In the negative electrode material mixture layer of the negative electrode precursor, the amount of the negative electrode material preferably is 10 to 90 mass % relative to the total mass of the negative electrode material mixture layer, for example. The amount of the binder preferably is 1 to 20 mass %, for example. In the case of adding the conductive auxiliary material, the amount of the conductive auxiliary material preferably is 1 to 90 mass % relative to the total mass of the negative electrode material mixture layer, for example.

The negative electrode material mixture layer preferably has a thickness of 10 to 100 µm, for example.

The buffer layer of the negative electrode precursor is a layer for suppressing a rapid reaction between the $SiO_x$ contained in the negative electrode material mixture layer and the Li contained in the Li-containing layer so as to prevent the curving of the negative electrode.

In other words, in the negative electrode precursor, the Li contained in the Li-containing layer is electrochemically introduced into the $SiO_x$ contained in the negative electrode material mixture layer through the buffer layer in an environment where a non-aqueous electrolyte (liquid electrolyte) of the battery is present (e.g., inside the battery). In an environment where the non-aqueous electrolyte is not present, on the other hand, such introduction reaction of Li into $SiO_x$ hardly occurs. As just described, the buffer layer has a function of supplying the Li contained in the Li-containing layer to the negative electrode material mixture layer through the non-aqueous electrolyte. This prevents direct reaction between $SiO_x$ and Li.

The buffer layer preferably is a layer (porous layer) containing an insulating material unreactive with Li and having pores that allow a non-aqueous electrolyte (liquid electrolyte) to pass through.

Examples of the insulating material for forming the buffer layer include various inorganic fine particles and various organic fine particles. As the inorganic fine particles, a chalcogenide (oxide, sulfide, etc.), hydroxide, nitride, carbide or silicide of a metal element or nonmetallic element is preferable.

As the chalcogenide of a metal element or nonmetallic element, an oxide is preferable, and more preferably an oxide that is difficult to reduce. Examples of such oxide include MgO, CaO, SrO, BaO, $ZrO_2$, ZnO, $B_2O_3$, $Al_2O_3$, $Ga_2O_3$, $In_2O_3$, $SiO_2$, $As_4O_6$ and $Sb_2O_5$. In addition, a hydroxide of a metal element capable of forming the oxide such as AlOOH (boehmite) may be used. Among them, ZnO, $Al_2O_3$, AlOOH, $Ga_2O_3$, $SiO_2$ and $ZrO_2$ are particularly preferable because they are highly insulating and chemically stable. The above oxides and hydroxide may be a simple compound or composite compound.

As the nitride of a metal element or nonmetallic element, aluminum nitride (AlN) or BN can be used. As the carbide or silicide of a metal element or nonmetallic element, SiC can be used. These are preferable because they are highly insulating and chemically stable.

As the organic fine particles serving as an insulating material for forming the buffer layer, those that are not fluidized to form a film or do not decompose at a temperature of not greater than 300° C. are preferable. For example, fine particles of a fluorocarbon resin such as polytetrafluoroethylene (PTFE) or a cross-linked latex can be used.

The insulating material preferably has a particle size of not less than 0.1 μm and not greater than 10 μm, and more preferably not less than 0.2 μm and not greater than 5 μm.

Preferably, the buffer layer further contains, in addition to the insulating material unreactive with Li, an electron conductive material. This is because the diffusion of Li proceeds smoothly by lowering the electric resistance between the negative electrode material mixture layer and the Li-containing layer. Examples of the electron conductive material for forming the buffer layer include: carbon material such as carbon particles and carbon fibers; metal material such as metal particles and metal fibers; and metal oxide. Among them, carbon particles or metal particles having low reactivity with Li are preferable.

As the carbon material contained in the buffer layer, any carbon material that has been conventionally used as a conductive auxiliary material for an electrode for a battery can be used. Specific examples include carbon particles and carbon fibers such as carbon black (thermal black, furnace black, channel black, lamp black, ketjen black and acetylene black) and graphite (natural graphite including flake graphite and amorphous graphite, and artificial graphite).

Among the above-listed carbon materials, a combined use of carbon black and graphite is particularly preferable in terms of dispersibility in a binder, which will be described later. As the carbon black, ketjen black or acetylene black is particularly preferable.

The carbon particles preferably have a particle size of not less than 0.01 μm and not greater than 10 μm, and more preferably not less than 0.02 μm and not greater than 5 μm.

The metal particles or metal fibers usable as the electron conductive material for forming the buffer layer preferably are made of a metal element having low reactivity with Li and incapable of forming an alloy with Li. Examples of the metal element for forming the metal particles or metal fibers include Ti, Fe, Ni, Cu, Mo, Ta and W.

In the case of using the metal particles, there is no particular limitation on the shape thereof. The metal particles can have any shape such as a cluster shape, needle-like shape, columnar shape or plate-like shape. Preferably, the surface of the metal particles or metal fibers is not excessively oxidized. If the surface of the metal particles or metal fibers is excessively oxidized, it is preferable to subject the metal particles or metal fibers to heat treatment in a reducing atmosphere before use to form the buffer layer.

The metal particles preferably have a particle size of not less than 0.02 μm and not greater than 10 μm, and more preferably not less than 0.1 μm and not greater than 5 μm.

As the combination of the insulating material unreactive with Li and the electron conductive material, for example, a combination of aluminum oxide ($Al_2O_3$) and a carbon material or a combination of boehmite and a carbon material is particularly preferable.

For the formation of the buffer layer, it is preferable to use a binder to bind the insulating material unreactive with Li and the electron conductive material. As the binder, any of those listed as the binder for the negative electrode material mixture layer can be used.

In the buffer layer, where the total mass of the insulating material unreactive with Li and the electron conductive material is assumed to be 100 mass %, the ratio of the electron conductive material preferably is not less than 2.5 mass % and not greater than 96 mass %, and more preferably not less than 5 mass % and not greater than 95 mass %. In other words, the ratio of the insulating material unreactive with Li preferably is not less than 4 mass % and not greater than 97.5 mass %, and more preferably not less than 5 mass % and not greater than 95 mass %.

In the case of using a binder for the formation of the buffer layer, where the total mass of the insulating material unreactive with Li, the electron conductive material and the binder is assumed to be 100 mass %, the ratio of the total amount of the insulating material unreactive with Li and the electron conductive material preferably is not less than 40 mass % and not greater than 96 mass %, and more preferably not less than 50 mass % and not greater than 94 mass %. In other words, the ratio of the binder preferably is not less than 4 mass % and not greater than 60 mass %, and more preferably not less than 6 mass % and not greater than 50 mass %.

The buffer layer preferably has a thickness of not less than 2 μm and not greater than 10 μm, and more preferably not less than 3 μm and not greater than 8 μm. As long as the buffer layer has a thickness within this range, direct reaction of the $SiO_x$ contained in the negative electrode material mixture layer and the Li contained in the Li-containing layer can be controlled efficiently, and a higher capacity and improved battery characteristics can be further ensured. For example, when the thickness of the buffer layer is much thinner relative to the surface roughness of the negative electrode material mixture layer, it is difficult to cover the entire surface of the negative electrode material mixture layer without creating pinholes, and thus the effect offered by the buffer layer may be reduced. On the other hand, when the buffer layer is too thick, it can lead to a reduction in battery capacity. For this reason, it is preferable to form the buffer layer as uniformly thin as possible.

By forming the buffer layer, the affinity between the negative electrode and the non-aqueous electrolyte increases. Thus, the effect of efficiently introducing a non-aqueous electrolyte into the battery can be expected.

The buffer layer having a predetermined thickness can be formed by applying a composition (coating material) in the form of a paste or slurry prepared by thoroughly mixing a mixture containing the insulating material unreactive with Li, the electron conductive material and the binder with an appropriate solvent (dispersing medium) onto the negative electrode material mixture layer, followed by drying to remove the solvent. The buffer layer may be formed by a method other than the above method. For example, the negative electrode material mixture layer and the buffer layer can be formed simultaneously by applying the composition for forming the negative electrode material mixture layer onto a current collector, after which the composition for forming the buffer layer is applied thereon before the formed film of the composition for forming the negative electrode material mixture layer is dried completely. Alternatively, instead of spraying the composition for forming the negative electrode material mixture layer and the composition for forming the buffer layer one by one, the negative electrode material mixture layer and the buffer layer can be formed simultaneously by spraying both the composition for forming the negative electrode material mixture layer and the composition for forming the buffer layer at the same time.

The Li-containing layer of the negative electrode precursor is a layer formed by a conventional vapor deposition method such as resistance heating or sputtering, in other words, a vapor-deposited film. The Li-containing layer can be formed by placing the buffer layer of the negative electrode precursor such that the buffer layer is opposed to a heat evaporation source in a vacuum chamber, and then performing vapor deposition until the thickness reaches a thickness predetermined based on a necessary amount of Li.

As stated previously, according to the present invention, it is possible to achieve a higher capacity battery by using $SiO_x$ covered with carbon as a negative electrode material and a Li-containing transition metal oxide as a positive electrode material. For this purpose, it is necessary to control the amount of Li introduced into the $SiO_x$ so as to prevent the deposition of lithium dendrites formed by excess Li. However, a conventional Li metal foil which is used as a Li supply source for a negative electrode material has low strength, and thus it is extremely difficult to form it to have a very small thickness (e.g., 10 μm or less). Even if such a Li metal foil having such small thickness is obtained, it may easily crack or break when applying the foil to the buffer layer. In addition, the Li metal foil has relatively large variations in thickness. Accordingly, even if the Li metal foil is used as a Li supply source for the negative electrode in the battery of the present invention containing the negative electrode material and the positive electrode material, the amount of Li introduced into the $SiO_x$ may be insufficient or excessive, failing to introduce an appropriate amount of Li uniformly into the entire negative electrode. For this reason, it is difficult to achieve both a high capacity and the prevention of battery characteristics degradation resulting from the deposition of lithium dendrites.

In contrast, according to the method in which the Li-containing layer is formed, as a vapor-deposited film, on the buffer layer by a vapor deposition method, because it is possible to easily form a uniform layer having a desired thickness over the entire surface of the buffer layer, an appropriate amount of Li necessary to compensate the irreversible capacity of $SiO_x$ can be introduced, and therefore a high capacity and improved battery characteristics can be achieved.

The method of forming the Li-containing layer by a vapor deposition method is disadvantageous in terms of productivity and of little practical use when the formation of a thick layer is required. However, in the battery according to the present invention, because $SiO_x$ covered with carbon having a relatively small irreversible capacity is used as a negative electrode material and a Li-containing transition metal oxide originally containing Li is used as a positive electrode material, the amount of Li to be supplied is relatively small, which can be effected by forming the Li-containing layer having a small thickness. Accordingly, even if the Li-containing layer is formed by a vapor deposition method, no productivity problem arises.

The Li-containing layer may comprise Li or a Li alloy such as Li—Al, Li—Al—Mn, Li—Al—Mg, Li—Al—Sn, Li—Al—In or Li—Al—Cd. When the Li-containing layer comprises a Li alloy, the content of Li in the Li-containing layer preferably is 50 to 90 mol %, for example.

The thickness of the Li-containing layer preferably is not less than 2 μm and not greater than 10 μm, and more preferably not less than 4 μm and not greater than 8 μm, for example. By forming the Li-containing layer to have a thickness within this range, an appropriate amount of Li necessary to compensate the irreversible capacity of $SiO_x$ can be introduced. In other words, when the Li-containing layer is too thin, the amount of Li will be small relative to the amount of $SiO_x$ present in the negative electrode material mixture layer, and the effect of increasing capacity may be reduced. Conversely, when the Li-containing layer is too thick, the amount of Li will be excessively large, and the effect of improving battery characteristics may be reduced. In addition, because the amount of deposited Li increases, the productivity decreases.

The positive electrode of the battery according to the present invention includes a Li-containing transition metal oxide as a positive electrode material (positive electrode active material). Specific examples of the Li-containing transition metal oxide include $Li_xCoO_2$, $Li_xNiO_2$, $Li_xMnO_2$, $Li_xCo_yNi_{1-y}O_2$, $Li_xCo_yM_{1-y}O_2$, $Li_xNi_{1-y}M_yO_2$, $Li_xMn_yNi_xCo_{1-y-z}O_2$, $Li_xMn_2O_4$ and $Li_xMn_{2-y}M_yO_4$ (in the listed formula, M represents at least one metal element selected from the group consisting of Mg, Mn, Fe, Co, Ni, Cu, Zn, Al, Ti, Ge and Cr, $0 \leq x \leq 1.1$, $0 \leq y \leq 1.0$, $2.0 \leq z \leq 1.0$).

The positive electrode can be obtained by applying a positive electrode material mixture-containing composition in the form of a paste or slurry prepared by thoroughly mixing a mixture (positive electrode material mixture) containing the positive electrode material, the conductive auxiliary material and a binder with an appropriate solvent (dispersing medium) onto a current collector to form a positive electrode material mixture layer having a predetermined thickness and a predetermined density. The method for producing the positive electrode is not limited to the above method, and it may be produced by a method other than the above method.

As the binder for the positive electrode, any of those listed as the binder for the negative electrode material mixture layer can be used. Likewise, as the conductive auxiliary material for the positive electrode, any of those listed as the conductive auxiliary material for the negative electrode material mixture layer can be used.

In the positive electrode material mixture layer of the positive electrode, the content of the positive electrode material preferably is 79.5 to 99 mass % relative to the total mass of the positive electrode material mixture layer, for example. The content of the binder preferably is 0.5 to 20 mass %, for example. The content of the conductive auxiliary material preferably is 0.5 to 20 mass %, for example.

As the non-aqueous electrolyte usable in the battery of the present invention, a liquid electrolyte prepared by dissolving the following inorganic ion salt in the following solvent can be used.

As the solvent, for example, an aprotic organic solvent can be used such as ethylene carbonate (EC), propylene carbonate (PC), butylene carbonate (BC), dimethyl carbonate (DMC), diethyl carbonate (DEC), methyl ethyl carbonate (MEC), γ-butyrolactone, 1,2-dimethoxyethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivative, sulfolane, 3-methyl-2-oxazolidinone, propylene carbonate derivative, tetrahydrofuran derivative, diethyl ether and 1,3-propanesultone. They can be used singly or in any combination of two or more.

Examples of the inorganic ion salt include $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, lithium lower aliphatic carboxylate, $LiAlCl_4$, LiCl, LiBr, LiI, lithium chloroborate and lithium tetraphenylborate. They can be used singly or in any combination of two or more.

Among the liquid electrolytes prepared by dissolving the inorganic ion salt in the above solvent, a liquid electrolyte prepared by dissolving at least one inorganic ion salt selected from the group consisting of $LiClO_4$, $LiBF_4$, $LiPF_6$, and $LiCF_3SO_3$ in a solvent containing ethylene carbonate or propylene carbonate and at least one selected from the group consisting of 1,2-dimethoxyethane, diethyl carbonate and methyl ethyl carbonate is preferable. An appropriate concentration of the inorganic ion salt in the liquid electrolyte is 0.2 to 3.0 mol/L, for example.

The non-aqueous secondary battery of the present invention can be obtained by introducing Li supplied from the Li-containing layer into the $SiO_x$ contained in the negative electrode material mixture layer by an electrochemical reaction in a battery case housing the above positive electrode, the above negative electrode precursor and the above non-aqueous electrolyte.

In the non-aqueous secondary battery of the present invention obtained in the above-described manner, the thickness of the Li-containing layer can be adjusted such that Li is contained in the $SiO_x$ at an atomic ratio y of Li to Si of $0.8 \leq y \leq 2.4$ at the time when discharge of the battery is finished. Because, in a state in which discharge of the battery is finished, Li is contained in the $SiO_x$ in an amount specified above, the Li sufficiently compensates the irreversible capacity of $SiO_x$. For this reason, the entire capacity of the positive electrode material can be used for charging and discharging, and actual reduction in capacity can be prevented. Consequently, a higher capacity battery can be achieved. In addition, as long as the Li amount is within the above range, a non-aqueous secondary battery having excellent battery characteristics can be produced without causing deposition of lithium dendrites.

At the time when discharge of the battery is finished, the atomic ratio y of Li to Si contained in the $SiO_x$ preferably is not less than 1.2 and not greater than 2.0.

The $SiO_x$ containing a necessary amount of Li introduced therein exhibits a peak at least in a range of 1850 to 1860 eV in an X-ray absorption near edge structure spectrum at the K absorption edge of Si in a state in which discharge of the battery is finished, which can be used as a criterion to determine the amount of lithium introduced. The peak observed in the X-ray absorption near edge structure spectrum is presumed to be a peak attributable to the production of lithium silicate by the introduction of Li.

As long as the non-aqueous secondary battery of the present invention comprises the above negative electrode, the above positive electrode and the above non-aqueous electrolyte, there is no particular limitation on its structure and components other than the negative electrode, the positive electrode and the non-aqueous electrolyte, and any component and any structure having been used in conventional non-aqueous secondary batteries can be applied to the non-aqueous secondary battery of the present invention.

For example, as the separator, a separator having sufficient strength and capable of retaining a large amount of liquid electrolyte is preferable. From this point of view, a 10 to 50 μm thick microporous film or non-woven fabric containing polyethylene, polypropylene or an ethylene-propylene copolymer and having a porosity of 30 to 70% is preferable.

In the non-aqueous secondary battery of the present invention, there is no particular limitation of its shape. It may have any shape such as a coin shape, button shape, sheet shape, laminate type, cylindrical shape, flat shape, prismatic shape or large type as used for electric vehicles, etc.

Because the non-aqueous secondary battery of the present invention has a high capacity and excellent battery characteristics, to maximize its characteristics, it can be applied to the applications in which conventional non-aqueous secondary batteries are used including as a power source for small and multifunctional portable devices.

Hereinafter, the present invention will be described by way of illustrative embodiments with reference to the drawings. Note that the average particle sizes of the composite particles, α-alumina and graphite used in the examples given below are volume average values measured by a laser diffraction scattering method using MICROTRAC HRA (Model: 9320-X100), a particle size distribution analyzer manufactured by Microtrac Inc. Note also that the unit used to express the amount of the materials used in the examples given below is mass %, which indicates a mass percentage of the entire solid.

Example 1

SiO particles (average particle size: 5.0 μm) serving as a raw material for the core particles were heated to about 1000° C. in an ebullated bed reactor to bring the heated core particles into contact with a mixed gas of benzene and a nitrogen gas heated at 25° C. for CVD treatment at 1000° C. for 60 minutes. The carbon (hereinafter referred to as "CVD carbon") produced by thermal decomposition of the mixed gas was deposited onto the surface of the core particles to form a covering layer thereon. Thereby, a negative electrode material was obtained.

The composition of the above-obtained negative electrode material was determined from a change in mass before and after the formation of the covering layer and found to be SiO:CVD carbon=85:15 (mass ratio).

Subsequently, using the negative electrode material, a negative electrode precursor sheet was produced in the following manner. A negative electrode material mixture-containing slurry was prepared by mixing the negative electrode material in an amount of 50 mass % with 40 mass % of graphite, 2 mass % of ketjen black (average particle size: 0.05 μm) serving as a conductive auxiliary material, 8 mass % of polyvinylidene fluoride (PVDF) serving as a binder and dehydrated N-methylpyrrolidone (NMP). Another slurry for forming the buffer layer was prepared by mixing 80 mass % of α-alumina (average particle size: 1 μm), 14 mass % of graphite (average particle size: 2 μm), 6 mass % of PVDF and dehydrated NMP.

Using a blade coater, the negative electrode material mixture-containing slurry and the slurry for forming the buffer layer were applied onto a 8 μm thick copper foil current collector such that the negative electrode material mixture-containing slurry formed a lower layer and the slurry for forming the buffer layer formed an upper layer. The current collector was then dried at 120° C. and compressed by a roller press so as to form a 35 μm thick negative electrode material mixture layer and a 7 μm thick buffer layer on one surface of the current collector to produce a laminate. The obtained laminate including the negative electrode material mixture layer and the buffer layer formed on one surface of the current collector was dried at 100° C. in a vacuum for 10 hours.

The dried laminate was then subjected to a heat treatment at 160° C. for 10 hours using a far-infrared heater. In the laminate after the heat treatment, the adhesion between the negative electrode material mixture layer and the current collector as well as the adhesion between the negative electrode material mixture layer and the buffer layer were excellent. Even after the cutting and bending, the negative electrode material mixture layer did not separate from the current collector, and the buffer layer did not separate from the negative electrode material mixture layer.

The laminate after the heat treatment was placed in a vacuum chamber, and a Li foil (purity: 99.8%) was mounted to a resistance heat evaporation source, after which deposition was performed to form a 8 μm thick Li-containing layer (Li metal layer) on the buffer layer of the laminate. Note that all the subsequent steps involving the negative electrode precursor were performed in an argon atmosphere. The laminate having the Li-containing layer formed thereon was punched into a disc having a diameter of 16 mm. Thereby, a disc-shaped negative electrode precursor was obtained.

A positive electrode was produced in the following manner. First, a positive electrode material mixture-containing slurry was prepared by mixing 96 mass % of $LiCoO_2$ serving as a positive electrode material, 2 mass % of ketjen black (average particle size: 0.05 μm) serving as a conductive auxiliary material, 2 mass % of PVDF serving as a binder and dehydrated NMP. The slurry was then applied onto a 15 μm thick aluminum foil current collector, which was then dried and pressed to form a 85 μm thick positive electrode material mixture layer on one surface of the current collector.

Subsequently, the negative electrode precursor produced above was bonded to a stainless steel case using a conductive adhesive. A microporous polyethylene film separator and the positive electrode were placed in this order on the negative electrode precursor. The negative electrode precursor and the positive electrode were placed such that the negative electrode material mixture layer and the positive electrode material mixture layer were in contact with the separator. A liquid electrolyte (non-aqueous electrolyte) prepared by dissolving 1 mol/L of $LiPF_6$ in a solvent containing EC and DEC at a volume ratio of 1:2 was injected into the case in an amount of 0.3 mL. The case was then sealed with a sealing member equipped with a gasket. In the sealed case, the Li contained in the Li-containing layer was electrochemically absorbed into the negative electrode material contained in the negative electrode material mixture layer. Thereby, a coin-type non-aqueous secondary battery was obtained.

Example 2

A mixture was prepared by mixing 80 g of SiO particles (average particle size: 1 μm), 20 g of fibrous carbon (average length: 2 μm, average diameter: 0.08 μm) and 10 g of polyvinyl pyrrolidone with 1 L of ethanol. The mixture was further mixed using a wet-type jet mill to prepare a slurry. Using the slurry, composite core particles comprising SiO particles and fibrous carbon (CF) were produced by a spray-drying method (ambient temperature: 200° C.). The composite core particles had an average particle size of 10 μm. The composite core particles in an amount of 10 g were then heated to about 1000° C. in an ebullated bed reactor to bring the heated composite core particles into contact with a mixed gas of benzene and a nitrogen gas heated at 25° C. for CVD treatment at 1000° C. for 60 minutes. Thereby, the carbon produced by thermal decomposition of the mixed gas was deposited onto the surface of the composite core particles to form a covering layer thereon. Thereby, a negative electrode material was obtained.

The composition of the above-obtained negative electrode material was determined from a change in mass before and after the formation of the covering layer and found to be SiO:CF:CVD carbon=68:17:15 (mass ratio).

Subsequently, the negative electrode material in an amount of 75 mass % was mixed with 15 mass % of graphite, 2 mass % of ketjen black (average particle size: 0.05 μm) serving as a conductive auxiliary material, 8 mass % of PVDF serving as a binder and dehydrated NMP to prepare a negative electrode material mixture-containing slurry. A negative electrode precursor was produced in the same manner as in Example 1 except that this negative electrode material mixture-containing slurry was used to form a negative electrode material mixture layer for the negative electrode precursor. A coin-type non-aqueous secondary battery was produced in the same manner as in Example 1 except that this negative electrode precursor was used.

Example 3

A mixture was prepared by mixing 70 g of SiO particles (average particle size: 1 μm), 30 g of graphite (average particle size: 3 μm) and 10 g of polyvinyl pyrrolidone with 1 L of ethanol. The mixture was further mixed using a wet-type jet mill to prepare a slurry. Using the slurry, composite core particles comprising SiO particles and graphite were produced by a spray-drying method (ambient temperature: 200° C.). The composite core particles had an average particle size of 15 μm. The composite core particles in an amount of 10 g were then heated to about 1000° C. in an ebullated bed reactor to bring the heated core particles into contact with a mixed gas of benzene and a nitrogen gas heated at 25° C. for CVD treatment at 1000° C. for 60 minutes. Thereby, the carbon produced by thermal decomposition of the mixed gas was deposited onto the surface of the composite core particles to form a covering layer thereon. Thereby, composite particles covered with the carbon covering layer were obtained.

The composite particles having the carbon covering layer in an amount of 100 g and 40 g of phenol resin were dispersed in 1 L of ethanol. The dispersion was sprayed and dried (ambient temperature: 200° C.) so as to form a phenol resin coating on the surface of the carbon covering layer. The composite particles coated with phenol resin were baked at 1000° C. to further form a material layer containing non-graphitizable carbon on the surface of the carbon covering layer. Thereby, a negative electrode material was obtained.

The composition of the above-obtained negative electrode material was determined from a change in mass before and after the formation of the carbon covering layer and a change in mass before and after the formation of the material layer containing non-graphitizable carbon, and found to be SiO:graphite:CVD carbon:non-graphitizable carbon=50:20:15:15 (mass ratio).

Subsequently, the negative electrode material in an amount of 90 mass % was mixed with 2 mass % of ketjen black (average particle size: 0.05 μm) serving as a conductive auxiliary material, 8 mass % of PVDF serving as a binder and dehydrated NMP to prepare a negative electrode material mixture-containing slurry. A negative electrode precursor was produced in the same manner as in Example 1 except that this negative electrode material mixture-containing slurry was used to form a negative electrode material mixture layer for the negative electrode precursor. A coin-type non-aqueous secondary battery was produced in the same manner as in Example 1 except that this negative electrode precursor was used.

Example 4

SiO particles (average particle size: 1 μm) in an amount of 200 g, 60 g of graphite (average particle size: 3 μm) and 30 g of polyethylene resin particles serving as a binder were introduced into a stainless steel container of a vibration mill with stainless steel balls added in the container, which were then mixed, pulverized and granulated for 3 hours. As a result, composite core particles (a composite of SiO and graphite) having an average particle size of 20 μm were produced. The obtained composite core particles in an amount of 10 g were heated to about 950° C. in an ebullated bed reactor to bring the heated composite core particles into contact with a mixed gas of toluene and a nitrogen gas heated at 25° C. for CVD treatment at 950° C. for 60 minutes. Thereby, the carbon produced by thermal decomposition of the mixed gas was deposited onto the composite core particles to form a covering layer thereon. Thereby, a negative electrode material was obtained.

The composition of the above-obtained negative electrode material was determined from a change in mass before and after the formation of the carbon covering layer and found to be SiO:graphite:CVD carbon=60:25:15 (mass ratio).

Subsequently, the negative electrode material in an amount of 80 mass % was mixed with 10 mass % of graphite, 2 mass % of ketjen black (average particle size: 0.05 μm) serving as a conductive auxiliary material, 8 mass % of PVDF serving as a binder and dehydrated NMP to prepare a negative electrode material mixture-containing slurry. A negative electrode precursor was produced in the same manner as in Example 1 except that this negative electrode material mixture-containing slurry was used to form a negative electrode material mixture layer for the negative electrode precursor. A coin-type non-aqueous secondary battery was produced in the same manner as in Example 1 except that this negative electrode precursor was used.

Example 5

A negative electrode precursor was produced in the same manner as in Example 1 except that the thickness of the Li-containing layer was changed to 4 μm. A coin-type non-aqueous secondary battery was produced in the same manner as in Example 1 except that this negative electrode precursor was used.

Comparative Example 1

A negative electrode precursor was produced in the same manner as in Example 4 except that the Li-containing layer was not formed. A coin-type non-aqueous secondary battery was produced in the same manner as in Example 4 except that this negative electrode precursor was used.

Comparative Example 2

A negative electrode precursor was produced in the same manner as in Example 4 except that the buffer layer was not formed. A coin-type non-aqueous secondary battery was produced in the same manner as in Example 4 except that this negative electrode precursor was used.

Comparative Example 3

A negative electrode precursor was produced in the same manner as in Example 4 except that the buffer layer and the Li-containing layer were not formed. A coin-type non-aqueous secondary battery was produced in the same manner as in Example 4 except that this negative electrode precursor was used.

The batteries produced in Examples 1 to 5 and Comparative Examples 1 to 3 were subjected to the following evaluation tests.

Visual Inspection of Negative Electrode

Forty-eight hours after the deposition of the Li-containing layer, each negative electrode was visually inspected for the presence of curvature.

Evaluation of Battery Characteristics

Each battery was charged and discharged under the following conditions. The battery was charged first at a constant current density of 0.5 mA/cm$^2$ until the charge voltage reached 4.2 V, and then at a constant voltage until the current density reached 0.05 mA/cm$^2$. The battery was discharged at a constant current density of 0.5 mA/cm$^2$ with an end-of-discharge voltage set at 2.5 V. After the first charge/discharge cycle, the rate of the discharge capacity to the charge capacity was determined, which was referred to as "initial charge/discharge efficiency". The above charge/discharge cycle was repeated, and the discharge capacity (C1) obtained at the second cycle was referred to as "rated capacity". Further, from the rated capacity and the discharge capacity (C2) obtained at the 200th cycle, capacity retention rate was calculated by the following equation for battery characteristics evaluation:

Capacity retention rate (%)=(C2/C1)×100.

Analysis of Negative Electrode Material

The negative electrode material of each battery in a state in which discharge was finished was analyzed to obtain an X-ray absorption near edge structure spectrum and to obtain the amount of Li contained in the negative electrode material in the following manner. The negative electrode was taken out from each battery after the first charge/discharge cycle performed for battery characteristics evaluation above, and then washed with a solvent (DEC) to completely remove the liquid electrolyte attached to the negative electrode, followed by drying. The negative electrode was then fixed to a specific jig. The X-ray absorption energy was measured by an electron yield method using an emitted light so as to determine the fine structure of the K-absorption edge. The washed and dried negative electrode was subjected to quantitative analysis of Li and Si using ICP (Inductive Coupled Plasma) method. Then, the amount of Li contained in the negative electrode material was calculated, and the atomic ratio y of the Li to the Si in the negative electrode material was determined.

Table 1 shows the results obtained in each evaluation test.

TABLE 1

| | Negative electrode | | | | |
|---|---|---|---|---|---|
| | Atomic ratio y of Li to Si in discharged negative electrode material | Electrode curvature | Rated capacity (mAh) | Initial charge/ discharge efficiency (%) | Capacity retention rate (%) |
| Ex. 1 | 1.8 | None | 8.6 | 93 | 80 |
| Ex. 2 | 1.7 | None | 9.0 | 93 | 85 |
| Ex. 3 | 1.7 | None | 9.0 | 93 | 90 |
| Ex. 4 | 1.7 | None | 8.9 | 93 | 90 |
| Ex. 5 | 1.0 | None | 8.1 | 87 | 80 |
| Comp. Ex. 1 | 0 | None | 6.9 | 75 | 70 |
| Comp. Ex. 2 | 1.7 | Observed | 8.5 | 93 | 40 |
| Comp. Ex. 3 | 0 | None | 6.8 | 73 | 40 |

Figure 3:
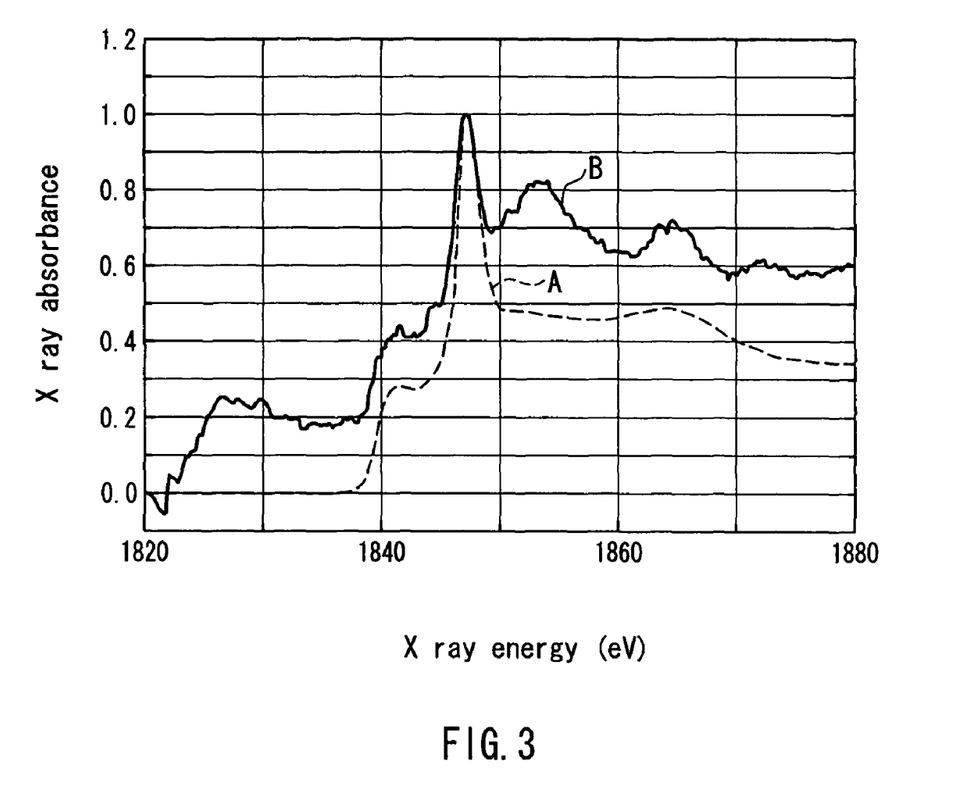
FIG. 3 is a graph showing an X-ray absorption near edge structure spectrum at the K absorption edge of Si obtained before the first charge/discharge cycle (indicated by A) and that after the same (indicated by B) for the negative electrode material of Example 1.

FIG. 3 shows an X-ray absorption near edge structure spectrum at the K absorption edge of Si obtained before the first charge/discharge cycle (indicated by A) and that after the same (indicated by B) for the negative electrode material of Example 1. In FIG. 3, a new peak is observed in the spectral range of 1850 to 1860 eV, indicating that the Li contained in the Li-containing layer was absorbed into the negative electrode material by charging and discharging. Furthermore, a similar peak is observed in the spectral range of 1850 to 1860 eV for each of the negative electrode materials of Examples 2 to 5.

As is clear from the results shown in Table 1, in the batteries of Examples 1 to 5, the Li contained in the Li-containing layer was absorbed into the negative electrode material contained in the negative electrode material mixture layer, whereby the irreversible capacity was compensated. Consequently, the entire capacity of the positive electrode material could be used in the charge/discharge reaction of the battery. In addition, a higher capacity and more improved initial charge/discharge efficiency than the batteries of Comparative Examples 1 and 3 having no Li-containing layer formed therein could be achieved. Further, in the batteries of Examples 1 to 5, because the Li-containing layer was formed by a vapor deposition method and the buffer layer was formed between the Li-containing layer and the negative electrode material mixture layer, the amount of Li absorbed into the negative electrode material could be controlled within an appropriate range, and therefore the negative electrode material could react with Li gradually and uniformly. For this reason, unlike the battery of Comparative Example 2 having no buffer layer formed therein, the negative electrodes were not curved and batteries having a high capacity retention rate even after the repetition of charge/discharge cycles could be obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A non-aqueous secondary battery comprising a positive electrode, a negative electrode and a non-aqueous electrolyte,
the positive electrode comprising a positive electrode material mixture layer containing a lithium-containing transition metal oxide,
the negative electrode comprising a negative electrode material mixture layer and a porous layer formed on the negative electrode material mixture layer,
the negative electrode material mixture layer including a negative electrode material comprising a core and a carbon covering layer covering a surface of the core,
the core being formed of a material comprising silicon and oxygen,
an atomic ratio x of the oxygen to the silicon of the core being $0.5 \leq x \leq 1.5$,
the porous layer containing an insulating material unreactive with lithium,
wherein the material comprising silicon and oxygen has a peak at least in a range of 1850 to 1860 eV in an X-ray absorption near edge structure spectrum at the K absorption edge of Si in a state in which discharge of the battery is finished.

2. The non-aqueous secondary battery according to claim 1,
wherein the material comprising silicon and oxygen includes a microcrystalline phase or amorphous phase of silicon.

3. The non-aqueous secondary battery according to claim 2, wherein the material comprising silicon and oxygen includes a silicon oxide, and the microcrystalline phase or amorphous phase of silicon is dispersed in a matrix of the silicon oxide.

4. The non-aqueous secondary battery according to claim 1,
wherein the core comprises a composite including the material comprising silicon and oxygen and a conductive material having a lower specific resistance value than the material comprising silicon and oxygen.

5. The non-aqueous secondary battery according to claim 1,
wherein the carbon covering layer is formed of a carbon produced by thermal decomposition of a hydrocarbon gas.

6. The non-aqueous secondary battery according to claim 1,
wherein the porous layer contains the insulating material and an electron conductive material.

7. The non-aqueous secondary battery according to claim 6,
wherein the insulating material is aluminum oxide or boehmite, and
the electron conductive material is a carbon material.

8. The non-aqueous secondary battery according to claim 1,
wherein the porous layer has a thickness of 2 to 10 µm.

9. The non-aqueous secondary battery according to claim 1, wherein the negative electrode material mixture layer further comprises graphite.

10. The non-aqueous secondary battery according to claim 1, wherein the material comprising silicon and oxygen includes a silicon oxide.

11. A non-aqueous secondary battery comprising a positive electrode, a negative electrode and a non-aqueous electrolyte,
the positive electrode comprising a positive electrode material mixture layer containing a lithium-containing transition metal oxide,
the negative electrode comprising a negative electrode material mixture layer and a porous layer formed on the negative electrode material mixture layer,
the negative electrode material mixture layer including a negative electrode material comprising a core and a carbon covering layer covering a surface of the core,
the core being formed of a material comprising silicon and oxygen,
an atomic ratio x of the oxygen to the silicon of the core being $0.5 \leq x \leq 1.5$,
the porous layer containing an insulating material unreactive with lithium,
wherein the material comprising silicon and oxygen contains lithium at an atomic ratio y of the lithium to the silicon of $0.8 \leq y \leq 2.4$ in a state in which discharge of the battery is finished.

12. The non-aqueous secondary battery according to claim 11,
wherein the material comprising silicon and oxygen comprises a microcrystalline phase or amorphous phase of silicon.

13. The non-aqueous secondary battery according to claim 12, wherein the material comprising silicon and oxygen includes a silicon oxide, and the microcrystalline phase or amorphous phase of silicon is dispersed in a matrix of the silicon oxide.

14. The non-aqueous secondary battery according to claim 11,
    wherein the core comprises a composite including the material comprising silicon and oxygen and a conductive material having a lower specific resistance value than the material comprising silicon and oxygen.

15. The non-aqueous secondary battery according to claim 11,
    wherein the carbon covering layer is formed of a carbon produced by thermal decomposition of a hydrocarbon gas.

16. The non-aqueous secondary battery according to claim 11,
    wherein the porous layer contains the insulating material and an electron conductive material.

17. The non-aqueous secondary battery according to claim 16,
    wherein the insulating material is aluminum oxide or boehmite, and
    the electron conductive material is a carbon material.

18. The non-aqueous secondary battery according to claim 11,
    wherein the porous layer has a thickness of 2 to 10 μm.

19. The non-aqueous secondary battery according to claim 11, wherein the negative electrode material mixture layer further comprises graphite.

20. The non-aqueous secondary battery according to claim 11, wherein the material comprising silicon and oxygen includes a silicon oxide.

* * * * *